(12) United States Patent
Sarkanen et al.

(10) Patent No.: US 6,172,204 B1
(45) Date of Patent: Jan. 9, 2001

(54) COMPOSITIONS BASED ON LIGNIN DERIVATIVES

(75) Inventors: Simo Sarkanen, Minneapolis; Yan Li, St. Paul, both of MN (US)

(73) Assignee: Regents of the University of Minnesota, Minneapolis, MN (US)

( * ) Notice: Under 35 U.S.C. 154(b), the term of this patent shall be extended for 0 days.

(21) Appl. No.: 09/326,040

(22) Filed: Jun. 4, 1999

(51) Int. Cl.[7] .............................. C07G 1/00; C08L 97/00

(52) U.S. Cl. ...................... 530/500; 530/504; 524/72; 524/73; 106/164.01; 106/164.4; 106/165.01

(58) Field of Search .................................. 530/500, 504; 524/72, 73; 106/164.01, 164.4, 165.01

(56) References Cited

PUBLICATIONS

Li et al., "The First 85% Kraft Lignin–Based Thermoplastics*", *J. Poly. Sci.: Part B: Poly. Physics*, 35:1899–1910 (1997).

Li et al., "Towards A New Generation Of Lignin–Based Plastics", *Proc. 8th Internat. Symp. Wood Pulp Chem. I*, p. 705–12 (1995).

*Primary Examiner*—Nathan M. Nutter
(74) *Attorney, Agent, or Firm*—Fish & Richardson P.C., P.A.

(57) ABSTRACT

A composition that includes the reaction product of a lignin derivative and a reactant selected from the group consisting of alkylating agents, acylating agents, and combinations thereof, where the reaction product has a measurable cohesive strength, and a plasticizer in an amount sufficient to cause the composition to exhibit plastic deformation in response to an applied tensile stress.

22 Claims, 4 Drawing Sheets

COMPOSITIONS BASED ON LIGNIN DERIVATIVES

STATEMENT AS TO FEDERALLY SPONSORED RESEARCH

This invention was funded pursuant to grants received from the Environmental Protection Agency (Grant Nos. 102500/Task 8 and 028408/EPA Task 8B) and the U.S.D.A. (Grant No. CSREES/98-35103-6730). Accordingly, the government may have rights in this invention.

BACKGROUND OF THE INVENTION

This application relates to preparing compositions based upon lignin derivatives.

Lignin is a naturally occurring polymeric material found in the cell walls of vascular plant material such as wood. Processes such as chemical pulping to produce paper, bio-ethanol generation, and production of chemicals and pharmaceuticals from plant expression systems result in the formation of lignin derivatives as by-products. Lignin derivatives are materials resulting from a physico-chemical modification of the native biopolymer that facilitates their removal from the vascular plant cell walls. Because these derivatives have poor mechanical properties, they typically are either discarded or, in the case of paper-making operations, used as fuel for the pulp mill.

SUMMARY OF THE INVENTION

In general, the invention features a composition that includes the reaction product of a lignin derivative and a reactant selected from the group consisting of alkylating agents, acylating agents, and combinations thereof, in which the reaction product has a measurable cohesive strength. A "measurable cohesive strength" means that when a specimen is subjected to a tensile strength test performed in accordance with ASTM Standard Test Method D 638-97 (as modified according to the Examples, described infra), the specimen exhibits a value sufficiently high such that it can be detected and recorded. In contrast, materials such as free-flowing powders lack a measurable cohesive strength.

The composition further includes a plasticizer in an amount sufficient to cause the composition to exhibit plastic deformation in response to an applied tensile stress. Such compositions are prepared by blending the plasticizer with the reaction product. "Plastic deformation" refers to a phenomenon in which the deformation exhibited by the specimen is a function of the applied tensile stress and remains upon release of the stress.

The particular amount of plasticizer required for plastic deformation depends upon a number of factors, including the particular plasticizer and reaction product. In general, however, the amount of plasticizer is no greater than about 50% by weight, preferably no greater than about 40% by weight, and, more preferably, no greater than about 30% by weight, where all weight percentages are based upon the total weight of the composition.

Examples of suitable alkylating agents for reaction with the lignin derivative include diazomethane, dialkyl sulfates such as diethyl sulfate, and combinations thereof. Examples of suitable acylating agents for reaction with the lignin derivative include acid anhydrides, acyl halides, and combinations thereof. More than one reactant may be reacted with the lignin derivative. For example, a first alkylating agent may be reacted with the lignin derivative to form an alkylated lignin derivative, which is then reacted with a second alkylating agent, different from the first alkylating agent, to form the reaction product. Similarly, combinations of different acylating agents may be reacted, as well as combinations of acylating and alkylating agents, to form the reaction product. Where a combination of an acylating and an alkylating agent are employed, it is preferable to react the acylating agent first, followed by the alkylating agent.

Examples of suitable plasticizers include polyalkylene esters, polyalkylene glycols, and derivatives thereof. Examples of useful polyalkylene esters include poly(1,4-butylene adipate) and poly(trimethylene glutarate). Examples of useful polyalkylene glycols, and derivatives thereof, include polyethylene glycol, poly(ethylene glycol) methyl ether, and the reaction product of poly(ethylene glycol) and a Bisphenol A diglycidyl ether. In general, polyalkylene esters, polyethylene glycols, and derivatives thereof are particularly useful where the lignin derivative is reacted with an alkylating agent, whereas polyalkylene glycols and derivatives thereof are particularly useful when acylating agents are used.

Examples of suitable lignin derivatives include derivatives prepared according to a process that includes subjecting a lignin-containing biomass (e.g., plant material) to a lignin-removing process selected from the group consisting of the kraft, organosolv, steam explosion, soda, and autohydrolysis extraction processes. Lignin derivatives prepared according to the kraft pulping process and the organosolv pulping process are particularly useful. Preferably, the product of the lignin removal process is filtered, e.g., in alkaline solution, with an ultrafiltration membrane having a molecular weight cut-off of at least about 10,000 daltons.

The invention provides plasticized compositions based upon alkylated and acylated lignin derivatives having useful mechanical properties. Accordingly, the invention provides a useful application for the lignin-containing by-products of commercial processes.

Other features and advantages of the invention will be apparent from the following description of the preferred embodiments thereof, and from the claims.

DETAILED DESCRIPTION

Figure 1:
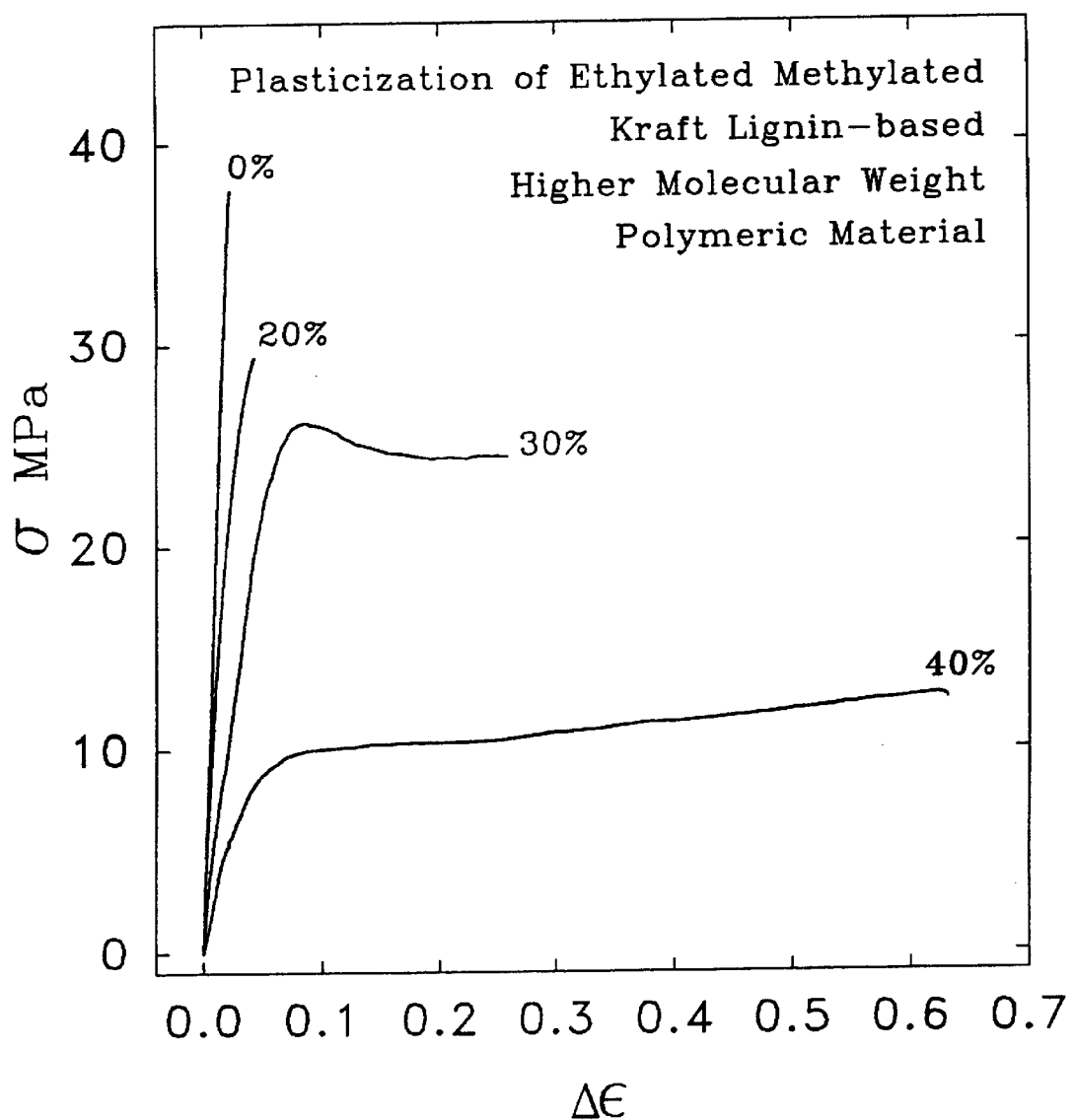
FIG. 1 is a graph having a series of curves demonstrating the stress-strain behavior of a high molecular weight fraction of an ethylated methylated kraft lignin derivative blended with various levels of poly(1,4-butylene adipate) as a plasticizer.

The invention provides polymeric compositions based upon lignin derivatives having good mechanical properties that make them useful as thermoplastics in a number of applications. The lignin derivatives may be obtained from a number of plant-based lignin-removing processes, including the kraft, organosolv, steam explosion, soda, and autohydrolysis extraction processes. Such derivatives are readily available. For example, kraft lignin derivatives are by-products of the principal process employed in the United States for chemically converting wood chips into pulp for making paper. Instead of burning the kraft lignin derivative as fuel in the pulp mill, it may be used to prepare polymeric compositions according to the invention.

The lignin derivatives prepared according to the above-described lignin-removing processes are preferably filtered prior to reaction to yield a relatively high molecular weight fraction, which is then reacted with an alkylating agent, acylating agent, or combination thereof. Useful ultrafiltration membranes are commercially available and include Amicon YM-series membranes available from Millipore Corporation. In general, membranes having a molecular weight cut-off of at least 10,000 daltons are preferred.

Useful alkylating agents are capable of reacting with the lignin derivative to covalently bond one or more alkyl groups to the lignin derivative under reaction conditions which do not otherwise degrade the lignin derivative. Specific examples include diazomethane and dialkyl sulfates such as dimethyl, diethyl, di-n-propyl, and di-n-butyl sulfate. Similarly, useful acylating agents are capable of reacting with the lignin derivative to covalently bond one or acyl groups to the lignin derivative under reaction conditions which do not otherwise degrade the lignin derivatives. Specific examples include carboxylic acid anhydrides and acyl halides. More than one alkylating or acylating agent may be used. In addition, alkylating and acylating agents may be used in combination with each other, in which case the acylating preferably is reacted first, followed by the alkylating agent.

The product of the alkylating or acylating reaction is relatively brittle. To improve the mechanical properties of the material, it is desirable to blend the alkylated or acylated reaction product with one or more plasticizers. The amount of plasticizer is sufficient to cause the composition to exhibit plastic deformation once a threshold tensile stress is reached. On a stress-strain curve, purely plastic deformation is manifested as a plateau in which elongation continues to increase as the tensile stress level remains relatively constant, although the effect is not uncommonly superimposed on elastic stress-strain behavior.

While the particular amount of plasticizer is a function of the specific composition, in general it is desirable to use the minimum amount of plasticizer needed for the composition to exhibit plastic deformation. Typically, this amount is no greater than 50% by weight, preferably no greater than 40% by weight, and, more preferably, no greater than 30% by weight based upon the total weight of the composition.

The choice of plasticizer is dictated by the particular alkylated or acylated lignin derivative. In general, the plasticizer preferably forms a homogeneous composition with the alkylated or acylated lignin derivative when added in an amount necessary for plastic deformation. Classes of suitable plasticizers include polyalkylene esters, polyalkylene glycols, and derivatives thereof. Polyalkylene esters and polyalkylene glycols, and derivatives thereof, are particularly useful in the case of alkylated derivatives, while polyalkylene glycols and derivatives thereof are particularly useful in the case of acylated derivatives. Specific examples of suitable polyalkylene esters include poly(ethylene adipate), poly(1,4-butylene adipate), poly(ethylene succinate), poly(hexamethylene adipate), poly(propylene adipate), poly(trimethylene adipate), and combinations thereof. Specific examples of suitable polyalkylene glycols and derivative thereof include polyethylene glycol, poly (ethylene glycol) methyl ether, the reaction product of poly(ethylene glycol) with a Bisphenol A diglycidyl ether, and combinations thereof.

The compositions may also contain additional ingredients in amounts that do not interfere with, but may enhance, the desired properties of the composition.

The invention will now be described further by way of the following examples.

EXAMPLES

Lignin Derivatives and High Molecular Weight Fractions Thereof

A Jack pine kraft lignin preparation was isolated from industrial black liquor, produced by the Boise Cascade Corporation (International Falls, Minn.), according to the method described in *J. Polym. Sci. B: Polym. Phys.*, 35, 1899–1910 (1997). A high molecular weight kraft lignin fraction was obtained by ultrafiltration of this preparation in aqueous 0.10 M NaOH through a 10,000 nominal molecular weight cut-off membrane (Amicon YM10 from Millipore Corp.). A total volume of permeate equivalent to 15 times the volume of solution in the ultrafiltration cell was allowed to pass through the membrane in a period sufficient to allow dissociation to occur between the individual molecular kraft lignin components. Ultrafiltration was then continued with distilled water until the pH of the permeate was reduced to 8–9, and thereafter the process was taken to completion with triply distilled water until the resulting permeate volume reached 15 times that of the solution in the ultrafiltration cell. After concentrating and centrifuging (3100× g, 30 min.) to remove any colloidally suspended sulfur, the kraft lignin species retained in solution (final pH=7.0–7.6) by the ultrafiltration membrane was freeze-dried.

Alkylation Procedure

The kraft lignin derivative, prepared as described above, was alkylated with a dialkyl sulfate in aqueous 60% dioxane at pH 11–12 under nitrogen using a concentration of 20 g/L under ambient conditions. Initially, 2 mL of dialkyl sulfate per gram kraft lignin derivative was added to the solution and the reaction allowed to proceed with vigorous stirring for 24 hours. Next, an additional 1 mL of dialkyl sulfate per gram of kraft lignin derivative was added twice a day at intervals 4–8 hours apart for an additional 3 days as the reaction was allowed to continue. Whenever the pH dropped below 11.0, aqueous 1 M NaOH solution was added to restore the pH to a value between 11 and 12. At the end of the reaction period, the solution was neutralized with aqueous 1.0 M HCl and subjected to evaporation under reduced pressure, whereupon removal of the dioxane resulted in the precipitation of the alkylated kraft lignin derivative. The precipitates were washed four times by resuspending in distilled water and centrifuging, and then air-dried, with the final traces of moisture being removed over $P_2O_5$.

If desired, the alkylated product was then methylated by reacting it with diazomethane absorbed in chloroform that had been generated from Diazald (Aldrich Chemical Co.) under alkaline conditions. The details of the experimental procedure are described in T. M. Garer, Jr., *Ph.D. Dissertation*, University of Minnesota, pp. 65–67 (1988).

Acylation Procedure

The kraft lignin derivative, prepared as described above, was dissolved in 3:5 (v/v) acetic anhydride:pyridine and allowed to stand under nitrogen (anhydrous conditions) in the dark for 72 hours. The resulting mixture was poured into aqueous 6% (v/v) pyridine at 0° C. to form a suspension which was then extracted with chloroform. The chloroform solution, in turn, was thoroughly extracted with aqueous 0.5 M sulfuric acid and then washed with water, whereafter it was dried with sodium sulfate.

If desired, the acylated product was methylated by reacting it with diazomethane absorbed in chloroform that had been generated from Diazald (Aldrich Chemical Co.) under alkaline conditions, as described under the Alkylation Procedure.

Preparation of Plasticized Compositions

The alkylated or acylated kraft lignin derivative was dissolved at a concentration of 130 g/L with an appropriated plasticizer in dimethyl sulfoxide (DMSO). The resulting solution was transferred to a 1.0×2.0 cm (width×length) teflon mold and then degassed under reduced pressure using ultrasonication to prevent bubble formation during subsequent solvent evaporation. Next, the mold with the sample solution was placed in a glass jar, which was then filled with nitrogen, covered with a screw-cap that was not fully tightened, and transferred to a vacuum oven that had been flushed with nitrogen. The solvent was first allowed to evaporate at 150° C. for 36 hours, after which the temperature was raised to 180° C. for 24 hours while the final traces of solvent were evenly removed under reduced pressure to produce solid samples. The solid samples (typically 1.0 mm thick) were then filed manually to create dogbone-shaped specimens for mechanical testing in which the dimensions of the narrow section were 0.5×0.9 cm (width×length).

Mechanical Testing

The stress-strain behavior of plasticized composition was determined according to ASTM Standard Test Method D 638-97 using an Instron Model 4026 Test System equipped with a ±1 kN static load cell and controlled by the Series IX Material Testing System software (version 6.05), with the exception that the dogbone-shaped specimens had the dimensions described above, and a crosshead speed of 0.05 mm min.$^{-1}$ was employed with specimen gauge lengths of 0.9 cm. For hard and brittle plastic samples, smooth grip faces were used to hold the dogbone-shaped plastic specimens firmly so that slippage would be prevented during the tensile test, while for relatively soft and flexible samples serrated grip faces were used. In both cases, brief heating was employed to soften the specimen placed between the grip faces before tightening. The temperature of the specimen was allowed to cool down to ambient temperature before starting the test.

Example 1

An alkylated lignin derivative was prepared by reacting the product of the ultrafiltration step first with diethyl sulfate and then with diazomethane under the conditions described above to yield a high molecular weight fraction of an ethylated methylated kraft lignin derivative. Plasticized compositions were then prepared by blending the alkylated material with poly(1,4-butylene adipate). The resulting compositions had plasticizer levels of 20%, 30%, and 40% by weight.

The stress-strain behavior of the plasticized compositions was measured as described above. For comparative purposes, an unplasticized composition was tested as well. The results are shown in FIG. 1. As shown in FIG. 1, plasticizer levels of 30% and 40% by weight resulted in compositions that exhibited plastic deformation once a threshold stress level was reached. In contrast, the compositions having 0% and 20% plasticizer exhibited stress-strain behavior characteristic of a brittle material, with little plastic deformation, until break.

Example 2

Figure 2:
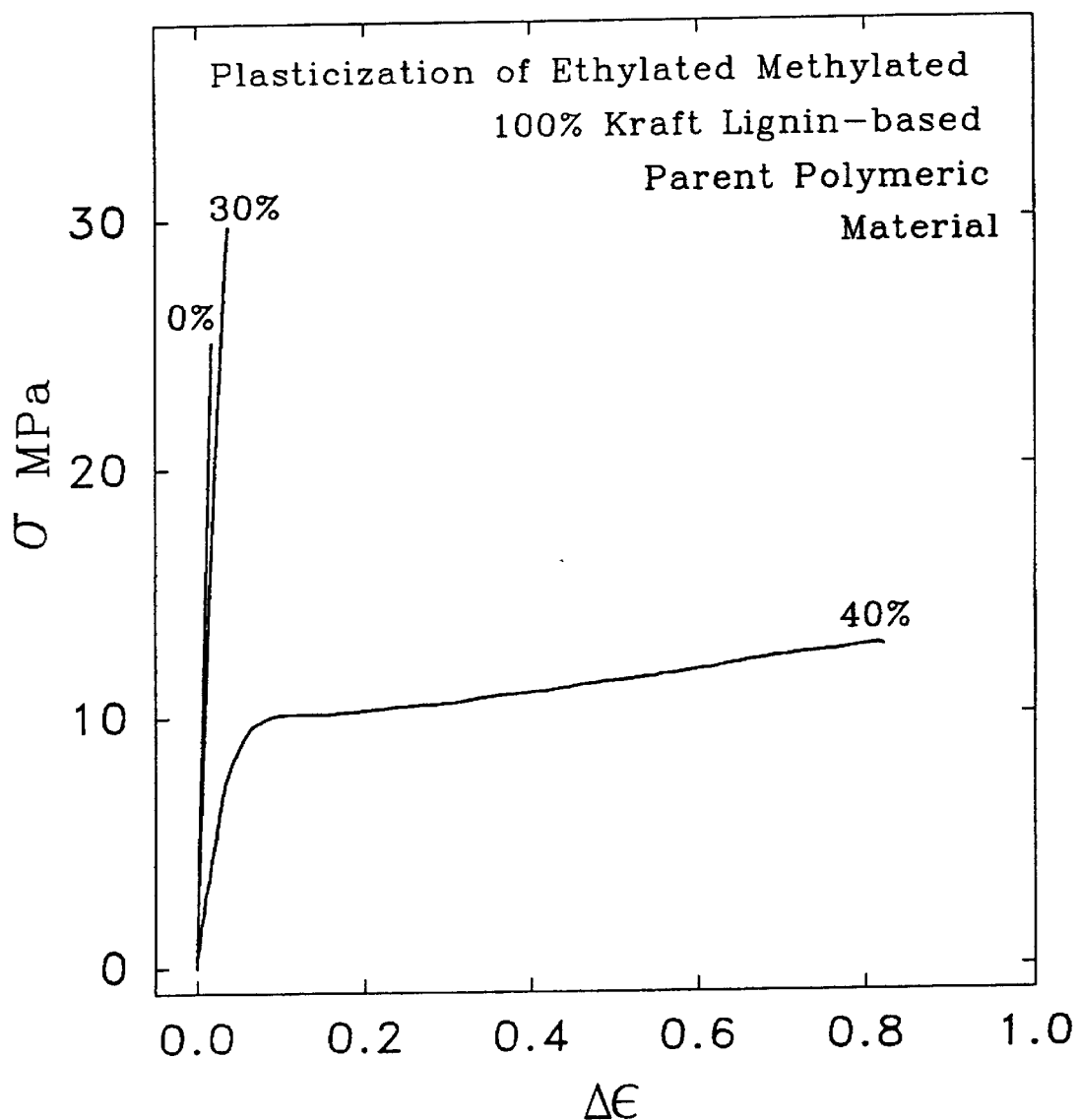
FIG. 2 is a graph having a series of curves demonstrating the stress-strain behavior of an ethylated methylated kraft lignin derivative blended with various levels of poly(1,4-butylene adipate) as a plasticizer.

The procedure of Example 1 was followed except that the kraft lignin derivative was not ultrafiltered prior to the alkylation reactions. In addition, a composition with a plasticizer level of 20% by weight was not prepared. The results of the mechanical testing are shown in FIG. 2. As shown in FIG. 2, only the sample having 40% by weight plasticizer exhibited extensive plastic deformation prior to break.

Example 3

Figure 3:
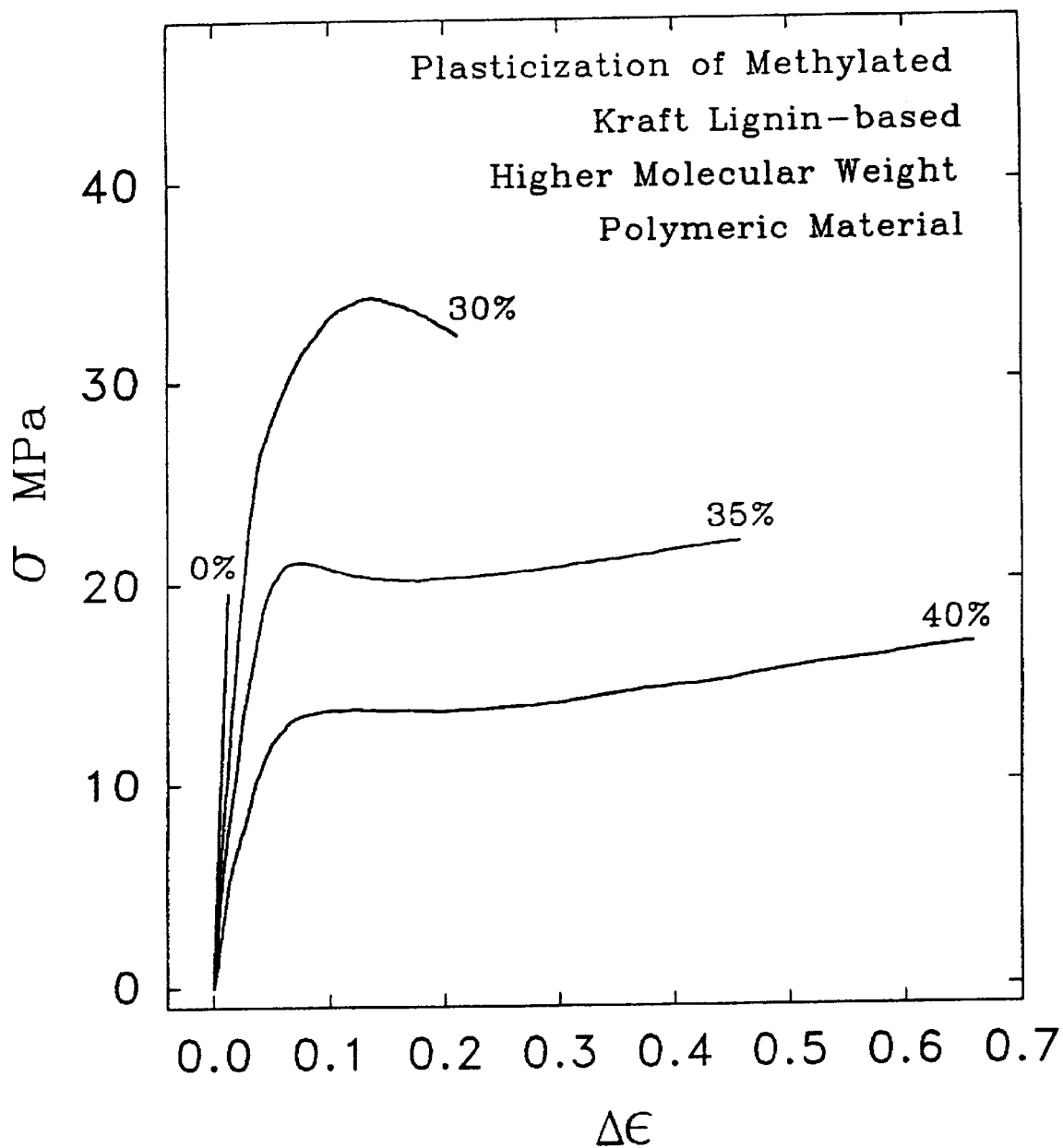
FIG. 3 is a graph having a series of curves demonstrating the stress-strain behavior of a high molecular weight fraction of a methylated kraft lignin derivative blended with various levels of poly(1,4-butylene adipate) as a plasticizer.

The procedure of Example 1 was followed except that the alkylating agents were dimethyl sulfate followed by diazomethane. In addition, plasticized compositions were prepared at plasticizer levels of 30%, 35%, and 40% by weight. The results of the mechanical testing are shown in FIG. 3. As shown in FIG. 3, samples having both 35% and 40% by weight plasticizer exhibited plastic deformation prior to break. The sample having 30% by weight plasticizer exhibited minimal plastic deformation, while the unplasticized sample exhibited essentially linear stress-strain behavior characteristic of a brittle material prior to break.

Example 4

An acetylated, alkylated lignin derivative was prepared according to the by reacting the product of the ultrafiltration step first with acetic anhydride and then with diazomethane under the conditions described above to yield a high molecular weight fraction of an acetylated methylated kraft lignin derivative. Plasticized compositions were then prepared by blending the acetylated alkylated material with the reaction product of poly(ethylene glycol) and a Bisphenol A diglycidyl ether. The resulting compositions had plasticizer levels of 20%, 30%, 35%, and 40% by weight.

Figure 4:
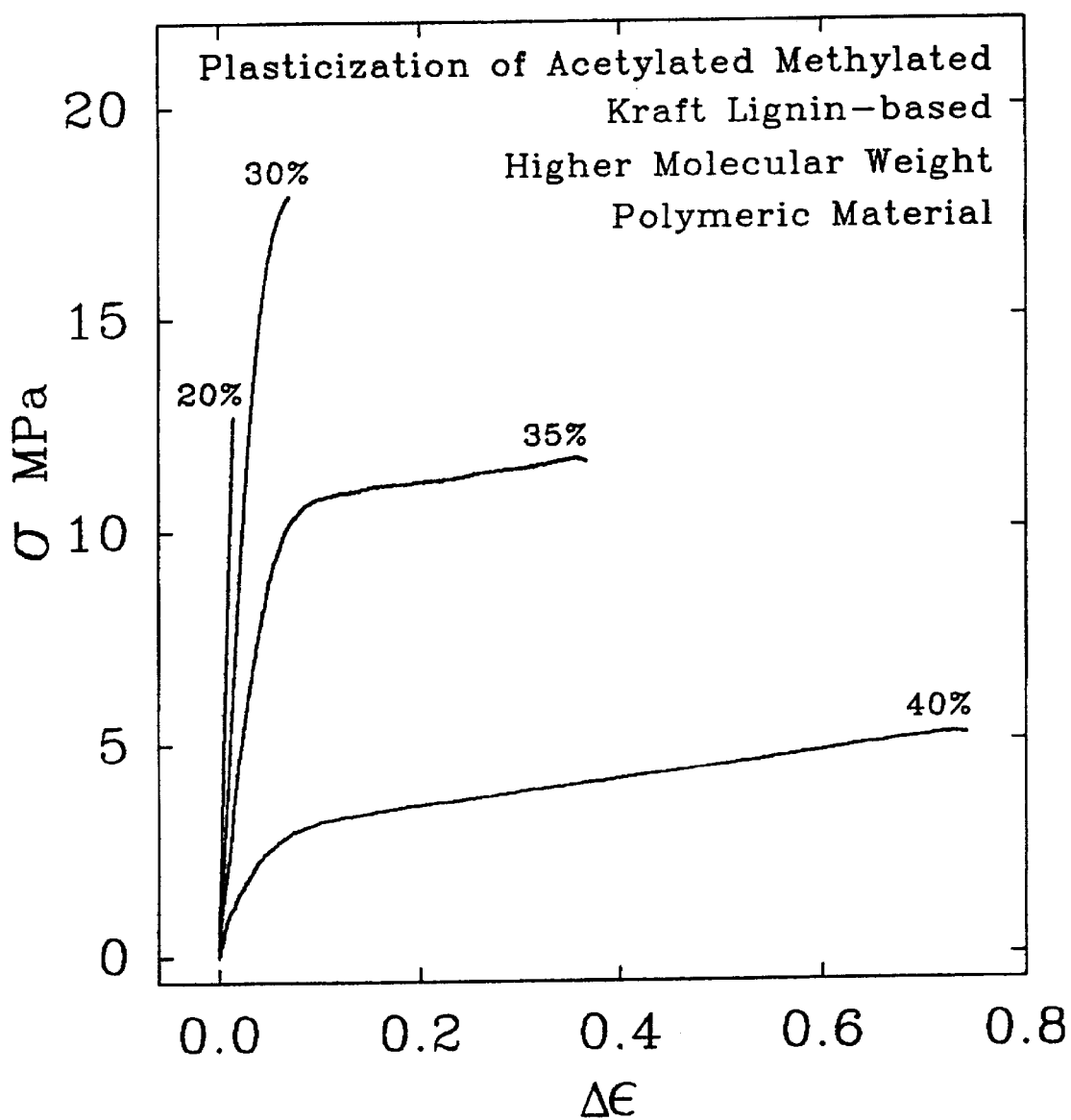
FIG. 4 is a graph having a series of curves demonstrating the stress-strain behavior of a high molecular weight fraction of an acetylated methylated kraft lignin derivative blended with various levels of the reaction product of poly(ethylene glycol) and a Bisphenol A diglycidyl ether as a plasticizer.

The stress-strain behavior of the plasticized compositions was measured as described above. The results are shown in FIG. 4. As shown in FIG. 4, plasticizer levels of 35% and 40% by weight resulted in compositions that exhibited plastic deformation once a threshold stress level was reached. In contrast, the compositions having 20% and 30% plasticizer exhibited stress-strain behavior characteristic of a brittle material, with little or no plastic deformation, until break.

Other embodiments are within the following claims.

What is claimed is:
1. A composition comprising:
   (a) the reaction product of a lignin derivative and a reactant selected from the group consisting of alkylating agents, acylating agents, and combinations thereof, said reaction product having a measurable cohesive strength; and
   (b) a plasticizer in an amount sufficient to cause said composition to exhibit plastic deformation in response to an applied tensile stress.
2. A composition according to claim 1, wherein said lignin derivative is prepared according to a process comprising subjecting a lignin-containing biomass to a lignin-removing process selected from the group consisting of kraft, organosolv, steam explosion, soda, and autohydrolysis extraction processes.
3. A composition according to claim 2 wherein said lignin-removing process is a kraft pulping process.
4. A composition according to claim 2 wherein said lignin-removing process is an organosolv pulping process.
5. A composition according to claim 2 further comprising filtering the product of the lignin-removing process with an ultrafiltration membrane having a molecular weight cut-off of at least about 10,000 daltons.

6. A composition according to claim 1 wherein said reactant comprises an alkylating agent.

7. A composition according to claim 6 wherein said alkylating agent is selected from the group consisting of diazomethane, dialkyl sulfates, and combinations thereof.

8. A composition according to claim 1 wherein said reaction product is prepared by reacting said lignin derivative with a first alkylating agent to form an alkylated lignin derivative, and then reacting said alkylated lignin derivative with a second alkylating agent, different from said first alkylating agent, to form said reaction product.

9. A composition according to claim 1 wherein said reactant comprises an acylating agent.

10. A composition according to claim 9 wherein said acylating agent is selected from the group consisting of acid anhydrides, acyl halides, and combinations thereof.

11. A composition according to claim 1 wherein said reaction product is prepared by reacting said lignin derivative with an acylating agent to form an acylated lignin derivative, and then reacting said acylated lignin derivative with an alkylating agent to form said reaction product.

12. A composition according to claim 1 wherein the amount of said plasticizer is no greater than about 50% by weight based upon the total weight of said composition.

13. A composition according to claim 1 wherein the amount of said plasticizer is no greater than about 40% by weight based upon the total weight of said composition.

14. A composition according to claim 1 wherein the amount of said plasticizer is no greater than about 30% by weight based upon the total weight of said composition.

15. A composition according to claim 1 wherein said plasticizer comprises a polyalkylene ester or derivative thereof.

16. A composition according to claim 15 wherein said plasticizer is selected from the group consisting of poly(1,4-butylene adipate), poly(trimethylene glutarate), and combinations thereof.

17. A composition according to claim 1 wherein said plasticizer comprises a polyalkylene glycol or derivative thereof.

18. A composition according to claim 17 wherein said plasticizer is selected from the group consisting of poly (ethylene glycol), poly(ethylene glycol) methyl ether, the reaction product of (polyethylene glycol) and a Bisphenol A diglycidyl ether, and combinations thereof.

19. A composition according to claim 1 wherein said reactant comprises an alkylating agent and said plasticizer is selected from the group consisting of polyalkylene esters and derivatives thereof, polyalkylene glycols and derivatives thereof, and combinations thereof.

20. A composition according to claim 1 wherein said reactant comprises an acylating agent and said plasticizer is selected from the group consisting of polyalkylene glycols and derivatives thereof.

21. A composition comprising:

(a) the reaction product of a lignin derivative and a reactant selected from the group consisting of alkylating agents, acylating agents, and combinations thereof, said reaction product having a measurable cohesive strength, wherein said lignin derivative is prepared according to a process comprising subjecting a lignin-containing biomass to a kraft pulping process and then filtering the product of the kraft pulping process with an ultrafiltration membrane having a molecular weight cut-off of at least about 10,000 daltons; and (b) a plasticizer selected from the group consisting of polyalkylene esters and derivatives thereof, polyalkylene glycols and derivatives thereof, and combinations thereof in an amount sufficient to cause said composition to exhibit plastic deformation in response to an applied tensile stress.

22. A process for preparing a composition comprising:

(a) reacting a lignin derivative and a reactant selected from the group consisting of alkylating agents, acylating agents, and combinations thereof to form a reaction product having a measurable cohesive strength; and (b) blending said reaction product with a plasticizer in an amount sufficient to cause said composition to exhibit plastic deformation in response to an applied tensile stress.

* * * * *